UNITED STATES PATENT OFFICE.

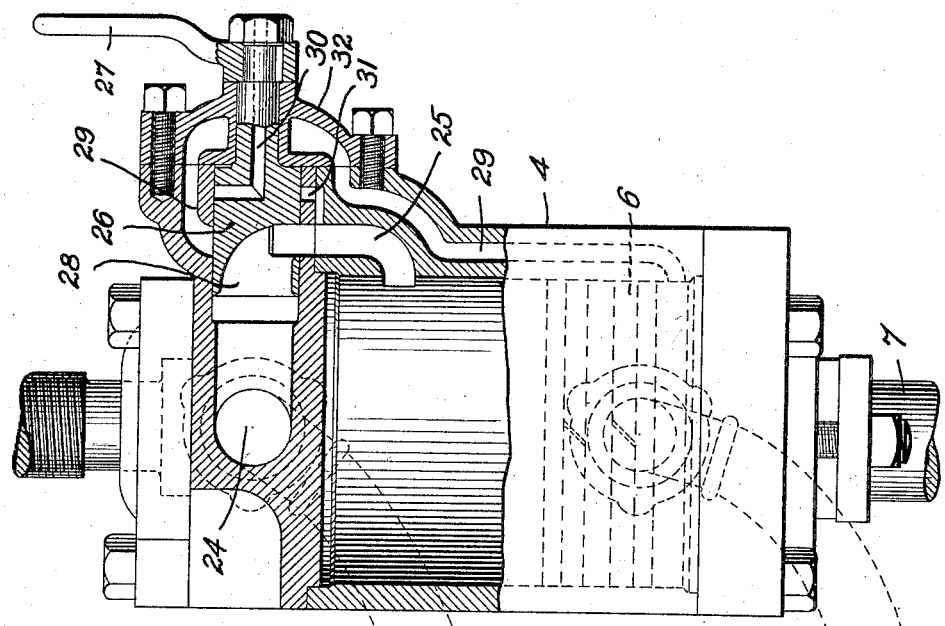
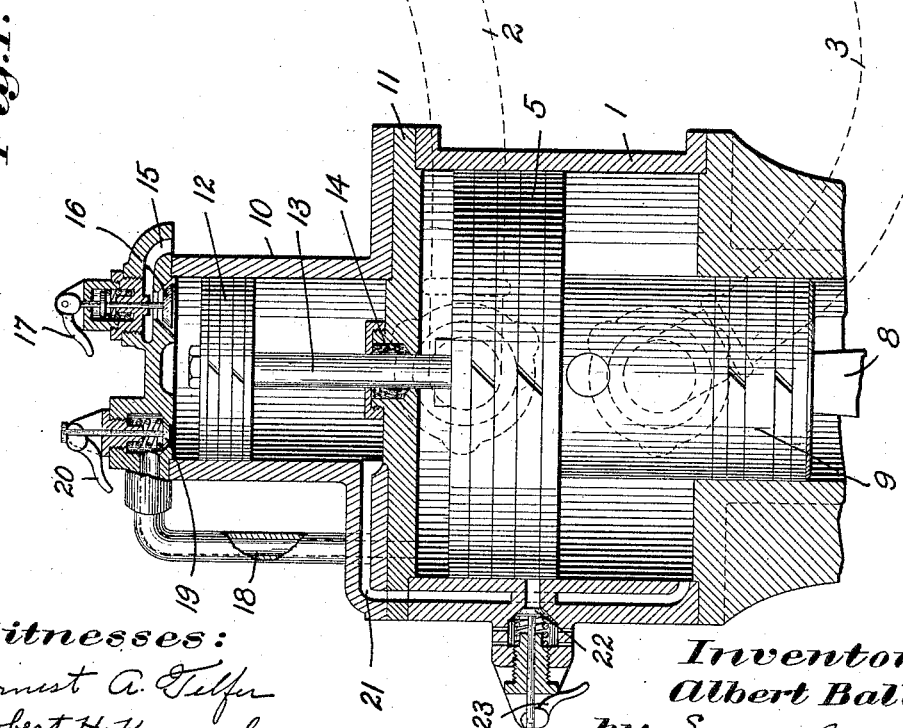

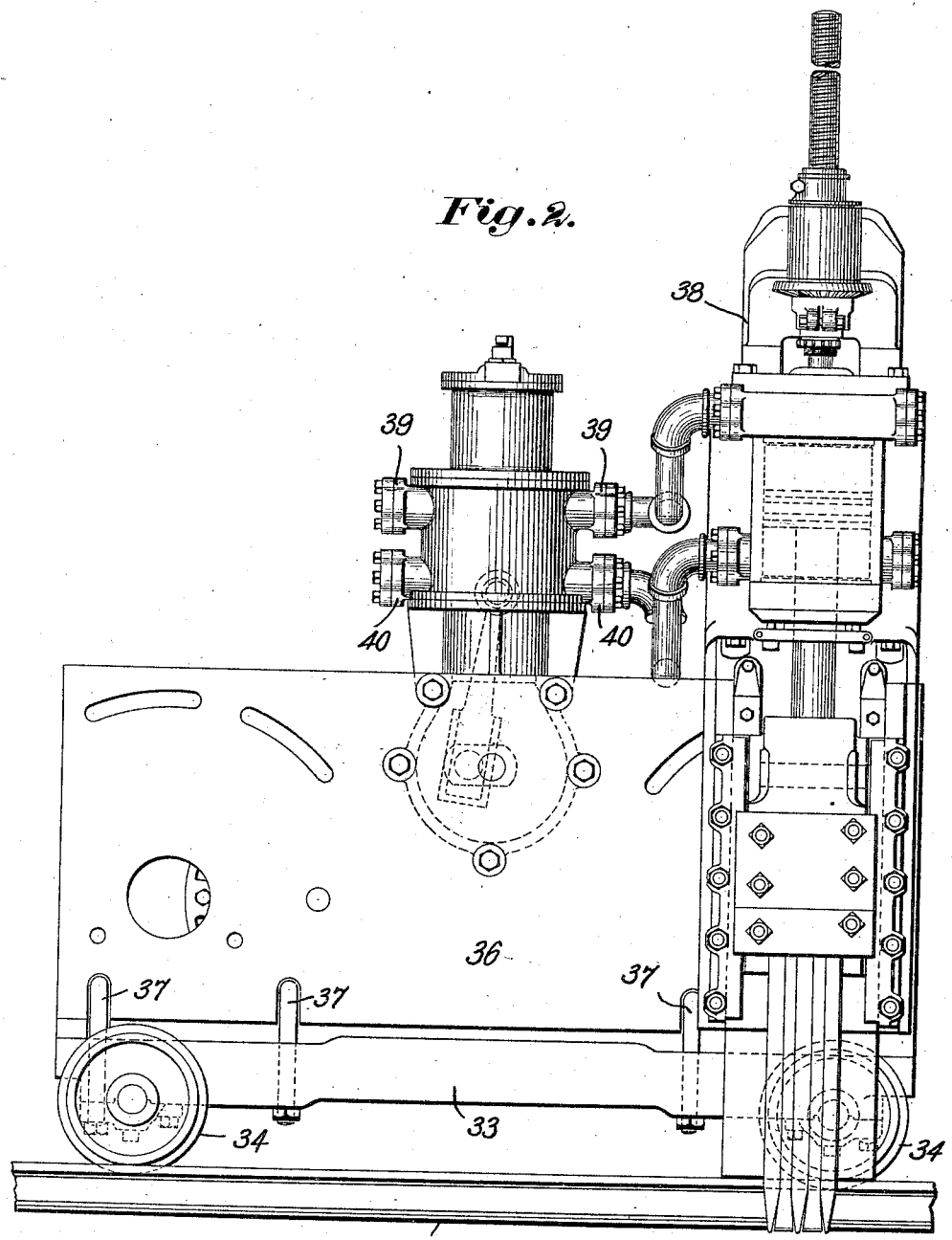

ALBERT BALL, OF CLAREMONT, NEW HAMPSHIRE, ASSIGNOR, BY MESNE ASSIGNMENTS, TO SULLIVAN MACHINERY COMPANY, OF BOSTON, MASSACHUSETTS, A CORPORATION OF MASSACHUSETTS.

FLUID PULSATING DEVICE.

1,179,993.  Specification of Letters Patent.  Patented Apr. 18, 1916.

Original application filed February 2, 1907, Serial No. 355,405. Divided and this application filed November 4, 1909. Serial No. 526,252.

*To all whom it may concern:*

Be it known that I, ALBERT BALL, a citizen of the United States, and a resident of Claremont, county of Sullivan, State of New Hampshire, have invented an Improvement in Fluid Pulsating Devices, of which the following description, in connection with the accompanying drawings, is a specification, like letters on the drawings representing like parts.

This invention relates to pulsators, and more particularly to pulsators of the reciprocating type.

In its present embodiment the invention is shown in a form especially adapted for employment in a channeling or other stone quarrying machine, but this is for illustration merely and the invention may be applied to any suitable purpose.

This application is a division of my prior application, Serial Number 355,405, filed February 2, 1907.

My invention will be best understood by reference to the following description when taken in connection with the accompanying drawings, showing one specific embodiment thereof, while its scope will be more particularly pointed out in the appended claims.

In the drawings: Figure 1 is a view partially in central, vertical section showing one form of pulsator and its connected working cylinder embodying one form of the invention; and Fig. 2 shows the utilization of the apparatus illustrated in Fig. 1 in a quarrying machine.

Referring to the drawings and the embodiment of my invention there shown for illustrative purposes, I have there shown a pulsator apparatus comprising a pulsator cylinder 1 suitably connected, as by the flexible hose or other appropriate conduit connections 2 and 3 shown in dotted lines, with the working cylinder 4, so that through reciprocations of the pulsator piston 5, air or other fluid may be alternately forced to opposite sides of the piston 6 and the latter together with the attached piston rod 7 thereby reciprocated for the performance of useful work.

The working cylinder and pulsator cylinder may be arranged in any desired relation or proximity and may be suitably constructed with reference to their external structure and support according to the use to which they are to be applied. The pulsator piston is given a reciprocatory movement from any suitable source of motive power, as for example an electric motor, (not shown) which latter may be connected to drive the piston through the pitman 8, the latter connected to the trunk piston 9 of the pulsator.

In order suitably to build up the air or other fluid of the pulsator, suitable means may be provided, the same herein consisting of a compressor 10 secured to the top plate 11 of the pulsator. Mounted within the compressor cylinder is the piston 12 having a piston rod 13 passing through the stuffing box 14 and connected to the piston 5 of the pulsator.

Any suitable fluid pressure connections between the compressor and the pulsator may be employed. Herein for that purpose is indicated a pressure inlet passage 15 at the upper end of the compressor, having a valve 16 normally spring seated and provided with means such as a cam lever 17 for holding the valve open. An outlet passage 18 leads from the upper end of the compressor to the upper end of the pulsator cylinder, said passage being controlled by a valve 19 normally spring pressed to its seat and having means, such as the cam lever 20, for holding the same open.

In the form of pulsator and compressor described, the building up of the air is accomplished by the upward stroke of the compressor piston 12, whereby air is forced into the upper portion of the pulsator above the piston thereof. A fluid pressure connection 21 leads from the lower portion of the compressor cylinder to the lower portion of the pulsator cylinder and a safety valve 22 normally spring pressed to its seat is provided at any suitable point in the pulsator and is furnished with means, such as the cam lever 23, for holding the same open.

As previously stated, the upper portion of the pulsator is joined by the conduit connection 2 to the upper portion 24 of the working cylinder 4, and, by means of an inlet port 25, pressure fluid is admitted from said conduit connection 2 to the upper side of the working cylinder piston 6.

In order to elevate the piston and the tool, or such other body as may be attached thereto, valve means may be employed whereby the fluid pressure entering through the connection 2 may be diverted to the lower end of the working cylinder below the piston 6 instead of above the same. Through this means, the working piston may be held elevated without interrupting the operation of the pulsator. To effect this result a valve 26 having a handle 27 is herein shown, such valve being rotatably mounted in the head plate of the working cylinder and provided with a passage 28 adapted to be placed in communication, as shown, with the inlet port 25 on the one hand or with a by-pass port 29 leading to the working cylinder beneath the piston thereof. As herein shown, the valve is provided with a vent passage 30 adapted to register with a vent 31 communicating with the upper portion of the working cylinder through the port 25, so that when pressure is admitted to the lower end through the by-pass 29, the pressure accumulated above the piston may be released through the vent passage 30. The valve 26 is herein shown as held in position by a suitable valve cap 32.

In the operation of the apparatus during the building up of the pressure in the pulsator, pressure fluid may be distributed to both sides of the pulsator piston by turning the valve 26 so as to connect the by-pass 29 with the connection 2, pressure fluid then passing from the upper end of the pulsator cylinder through the connection 2 and the valve 26 thence to the lower end of the working cylinder and back to the lower end of the pulsator piston through the connection 3. During the building up operation the valves 16 and 19 are free so that the compressor piston 12 acts to compress air and force the same through the passage 18 into the upper end of the pulsator cylinder. This action may be continued as long as it is desired, but when it is wanted to cut out the action of the compressor, the inlet valve 16 is held open by its cam lever, thereby stopping the compressing action.

Preferably the cross sectional area of the compressor cylinder substantially equals that of the trunk piston 9, plus the cross sectional area of the piston rod 13, so that the under side of the compressor piston, acting as a pulsator in conjunction with the piston 5 through the connecting passage 21, affords a balancing of pressure upon opposite sides of the pulsator piston. Should it be desired, the upper side of the compressor piston can also be used to supplement the pulsating effect of the upper side of the pulsator piston by freeing the valve 16 and holding the outlet valve 19. During the building up or compressing action, the operator can ascertain when the desired point of pressure is reached by setting the safety valve 22 to blow off at the required point.

Referring to Fig. 2, I have therein shown the apparatus of Fig. 1 applied to the reciprocatory actuation of a tool,—herein the gang of tools for a stone channeling machine. The latter has the usual body or frame 33 supported upon the trucks 34, which run on the tracks 35. To support the pulsator and working cylinder there is provided the usual adjustable swing plate 36 secured to the side of the frame by the U-shaped bolts 37. In this, as in many other machines or devices to which the pulsator principle may be applied, it is often necessary or desirable to shift or adjust the relation of the working cylinder relatively to that of the pulsator cylinder. In the case of the stone channeling machine, for example, it is necessary at times to operate the machine with the supporting standard 38 for the working cylinder bolted to the swing plate at one end of the machine and at other times with such standard bolted to the swing plate at the opposite end thereof. The operation of the apparatus, however, is materially improved when the conduit connections 2 and 3 are kept of substantially the same length for all positions of the working cylinder, and ordinarily, though not necessarily, when their length is reduced to a minimum so that the clearance space between the two cylinders is cut down to a small amount.

In order to preserve the same clearance relations between the two cylinders, irrespective of the position to which the working cylinder is adjusted, both the pulsator and the working cylinder are herein provided with upper and lower couplings 39, 39 and 40, 40, respectively, at each side of the cylinder so that the same connections 2 and 3 may be utilized on whichever side of the pulsator the working cylinder may be placed. When the working cylinder is located on one side of the pulsator, connections are made to the couplings on that side, and, when located on the opposite side, to connections on that side. Both the pulsator and working cylinder are thereby provided at each end with circumferentially different exit-entrance openings for the air, either one of which may be utilized, the remaining opening being closed by a suitable cap when out of use. This permits the adjustment of the working cylinder relatively to the pulsator while maintaining substantially the same conditions of clearance in all positions of adjustment.

I claim—

1. The combination with a pulsator apparatus having a cylinder and piston and means for reciprocating the piston, of a compressor having a piston therein, with its piston rod, said compressor having a valved fluid pressure inlet at one side of said compressor piston, a fluid supply passage leading from said side of said piston to the correponding side only of the pulsator piston, a valve for said passage, means for holding said valve open, and said pulsator apparatus having also a working cylinder and piston and connections for the passage of pressure fluid between the same and said pulsator at opposite sides thereof.

2. The combination with a pulsator apparatus having a cylinder and piston and means to operate the same, of a compressor having a piston connected to that of the pulsator, said compressor having a valve controlled pressure inlet to said compressor, a valve controlled pressure supply passage leading from one side of the piston of said compressor to the corresponding side of the piston of the pulsator, and a fluid pressure passage connecting the opposite side of said compressor piston to the opposite side of the pulsator piston.

3. The combination with a pulsator apparatus having a cylinder and piston, of a compressor mounted thereon also provided with a piston, a connection between the pistons in said pulsator and compressor, said compressor having a valve controlled pressure inlet passage at one side of said compressor piston, a valve controlled pressure supply passage leading from the same side of said compressor piston to the corresponding side of said pulsator piston, and a fluid pressure passage from the opposite side of said compressor piston to the corresponding side of said pulsator piston, and said apparatus having also a working cylinder and piston and fluid pressure connections from said working cylinder to said pulsator.

4. The combination with a pulsator apparatus having a cylinder and piston, of a compressor cylinder 10 mounted thereon also provided with a piston, of a connection between the pistons 5 and 12 in said pulsator and compressor respectively, said compressor having a valve controlled inlet passage 15 to said compressor, a valve controlled passage 18 from one side of said compressor to the corresponding side of said pulsator piston, a fluid pressure passage 21 connecting corresponding portions of said compressor and pulsator cylinders, and said apparatus having also a working cylinder 4, with contained piston 6, fluid passage connections 2 and 3 between the same and said pulsator on opposite sides of said pulsator piston, inlet passages 25 and 29 for said working cylinder on opposite sides of the piston 6 and a valve 26 controlling the same.

5. The combination with a pulsator apparatus having a cylinder and piston, of a working cylinder with its contained piston, said cylinders having fluid pressure passages opening to the upper and lower ends thereof, a pressure fluid connection from one end of the pulsator cylinder to one end of said working cylinder, a second pressure fluid connection from the other end of said pulsator cylinder to said working cylinder, branched pressure supply passages leading to opposite ends of said working cylinder and open to the passage of pressure fluid in either direction, a valve having a passage connected at one end with said second fluid pressure connection from said pulsator and adapted to connect at its other end with either of said branched passages, a compressor cylinder mounted on said pulsator, the pistons of said pulsator and compressor being connected, a pressure supply inlet for said compressor cylinder, and a valved pressure passage connecting the compressor cylinder and said pulsator cylinder for building up pressure in the latter.

6. An apparatus comprising a pulsator cylinder 1 and piston 5, a working cylinder, a piston therein, said apparatus having fluid pressure connections between said working cylinder and said pulsator cylinder, a compressor cylinder 10 mounted upon said pulsator cylinder, a compressor piston 12, a piston rod 13, said compressor having a valved pressure inlet passage 15, and said apparatus having also a valved fluid passage 18 connecting said compressor and pulsator for building up pressure in the latter, a passage 21 connecting the compressor cylinder and pulsator cylinder, pressure supply passages 25 and 29 for said working cylinder, and a valve 26 to control said passage.

7. The combination with a pulsator having a piston and a cylinder therefor provided with an outlet at each end, of a compressing device, comprising a cylinder having a valve-controlled inlet, a piston therein, a connection between said pistons, there being provided an open passage connecting one side of the compressor piston with one side of the pulsator piston and a valve controlled passage connecting the opposite side of said compressor piston with the opposite side of said pulsator piston.

8. An apparatus comprising a pulsator having its cylinder and contained piston, and a compressor having a cylinder and contained piston, said compressor cylinder being provided with valved inlet and outlet passages, said outlet passage leading to the pulsator, a connection between said pistons, said apparatus having a passage maintaining free open communication between one side of said compressor piston and one side of said pulsator piston whereby the compressor serves to assist said pulsator in its pulsating action, 9. An apparatus comprising a pulsator having its cylinder and contained piston and a single acting compressor having its cylinder and contained piston, a connection between said pistons, the compressing end of said compressor cylinder being provided with inlet and discharge valves and provided with a passage controlled by the discharge valve and communicating with said pulsator cylinder and the non-compressing end of said compressor cylinder having free communication with an end of said pulsator cylinder whereby on one movement the said compressor piston serves to compress fluid and on its reverse movement to assist the said pulsator.

10. An apparatus comprising a pulsator having its cylinder and contained piston and a single acting compressor having its cylinder and contained piston, a connection between said pistons, the compressing end of said compressor cylinder being provided with inlet and discharge valves and provided with a passage controlled by the discharge valve and communicating with said pulsator cylinder and the non-compressing end of said compressor cylinder having free communication with an end of said pulsator cylinder whereby on one movement the said compressor piston serves to compress fluid and on its reverse movement to assist the said pulsator and means for holding open the said discharge valve at the compressing end of said compressor cylinder whereby the compressing end thereof may also be made to assist said pulsator.

11. A pulsator having a cylinder and a piston and operating means therefor, a compressor for supplying pressure fluid to said cylinder, said compressor having valve controlled inlet and discharge passages, the discharge passage leading to said pulsator, and means for holding open the discharge valve.

12. An apparatus comprising a pulsator having a cylinder and a piston with operating means therefor, a compressor mounted upon an end thereof, valve-controlled inlet and discharge passages for said compressor, said discharge passage communicating with said pulsator, and means for holding open the discharge valve.

13. A pulsator having a cylinder and a piston, a piston-rod and operating means therefor, said piston having unequal effective pressure areas on opposite sides thereof, an auxiliary cylinder having pressure fluid connections with said pulsator and having a piston therefor connected to the pulsator piston and provided with an area having communication with and supplementing that of the piston-rod side of the pulsator piston.

14. An apparatus comprising a pulsator having a cylinder and a piston and operating means therefor, a working cylinder having a piston, said apparatus having fluid pressure connections between the opposite ends of said pulsator and working cylinders respectively, and valve means for directing pressure supplied at one end of said working cylinder to either end thereof, said working cylinder having a valve controlled vent for relieving pressure from an end thereof.

15. An apparatus comprising a pulsator having a cylinder and a piston and operating means therefor, a working cylinder having a piston, fluid pressure connections between opposite ends of said pulsator and working cylinder respectively, a valve with controlled passages for directing pressure supplied at an end of said working cylinder to either end of said working cylinder, said working cylinder having a vent passage and said valve being adapted to relieve pressure at one end of said cylinder through said vent passage when pressure is directed to the opposite end thereof.

16. An apparatus comprising a pulsator having a cylinder and a piston and operating means therefor, a working cylinder 4 having a piston and fluid pressure connections with the opposite ends of said pulsator cylinder, said working cylinder having fluid pressure passages 24, 25 and 29, and a valve 26 controlling said passages, vent passages 30 and 31 being also provided for venting the cylinder.

17. An apparatus comprising a pulsator having a cylinder and a piston of operating means therefor, a working cylinder provided with a piston therein, a piston rod, pressure fluid connections between said pulsator cylinder and said working cylinder including supply passages 25 and 29 leading respectively to opposite sides of the piston, and a valve adapted to place the passage connected to one side of the piston in communication also with the remaining side of said piston, there being provided vent passages 31 and 30 in said cylinder and said valve respectively.

18. The combination with a pulsator adapted to operate a driven element through a reciprocating body of air, of a compressing device in addition to said pulsator, and means providing for the utilization of said compressing device as a pulsating device to assist said pulsator.

19. The combination with a pulsator adapted to operate a driven element through a reciprocating body of air, of a compressing device having a reciprocating member reciprocating in unison with said pulsator, an inwardly opening admission check valve for said compressing device, there being provided a passage connecting said compressing device and said pulsator, an outwardly opening check valve controlling the same, and means for providing at will free communication between said compressing device and said pulsator to cause the former to assist the latter in reciprocating the driving element.

20. The combination with a pulsator having a cylinder and a piston with unequal effective pressure areas, an auxiliary cylinder and piston having an area sufficient to supplement the lesser effective area of the pulsator piston; fluid connections between said cylinders, and means to operate said auxiliary piston in unison with said pulsating piston.

21. The combination with a pulsator having a cylinder and a piston therein, an auxiliary piston connected thereto, an auxiliary cylinder in which said latter piston is adapted to reciprocate, means to utilize said auxiliary piston as a compressing device or as a pulsating device to supplement the pulsator piston.

22. The combination with a pulsator, of a compressing device having a passage communicating with the pulsator, a check valve in said passage opening from said compressing device to said pulsator, and means for holding said check valve in an open position.

23. The combination with a pulsator, of a compressing device connected therewith, inlet and discharge valves for said compressing device, and means for holding said valves open to cause the lowering of the pressure of said pulsator.

24. The combination with a pulsator, of a compressing device connected therewith, and means for opening communication with the atmosphere through said compressing device to lower the pressure of said pulsator.

25. In a pulsating system, the combination with a working piston, of its cylinder, pipes for supplying pressure fluid alternately to the opposite sides of the piston, and a single controlling valve with controlled passages for opening one end of the cylinder to the atmosphere and applying to the opposite end thereof a substantially constant pressure.

27. An apparatus comprising a working cylinder, a pulsator having its cylinder and contained piston, the latter having unequal effective pressure areas on opposite sides thereof, pulsating means operating in unison with said piston and having fluid pressure connection with said cylinder for assisting that side of the piston having the lesser effective pressure area and for substantially equalizing pulsations on opposite sides of the pulsator piston and connections between the working cylinder and pulsator.

28. The combination with a pulsator of a compressor, connections from the compressor to deliver pressure fluid to said pulsator and means for utilizing said compressor as a pulsator to assist said pulsator.

29. The combination with a pulsator of a compressor, connections from the compressor to deliver pressure fluid thereto, means for operating said compressor in unison with said pulsator, and means for maintaining either free or valve controlled communication between said compressor and pulsator to cause the former to act as a compressor or as an auxiliary pulsator.

30. The combination with a main pulsator for causing fluid pressure pulsations and an auxiliary pulsator of means for rendering said auxiliary pulsator effective or ineffective at will.

In testimony whereof, I have signed my name to this specification, in the presence of two subscribing witnesses.

ALBERT BALL.

Witnesses:
 GEO. W. GILMAN,
 LEE A. KNIGHT.

Copies of this patent may be obtained for five cents each, by addressing the "Commissioner of Patents, Washington, D. C."

It is hereby certified that in Letters Patent No. 1,179,993, granted April 18, 1916, upon the application of Albert Ball, of Claremont, New Hampshire, for an improvement in "Fluid Pulsating Devices," errors appear in the printed specification requiring correction as follows: Page 2, line 66, after the word "holding" insert the word *open;* page 3, line 47, claim 4, strike out the comma and the word "of" and insert the reference-numeral and comma *12,;* same page, line 82, claim 5, after the word "pulsator" insert the word *cylinder;* and that the said Letters Patent should be read with these corrections therein that the same may conform to the record of the case in the Patent Office.

Signed and sealed this 5th day of March, A. D., 1918.

[SEAL.]

R. F. WHITEHEAD,

*Acting Commissioner of Patents.*

Cl. 125—2.